(12) United States Patent
Sawada

(10) Patent No.: US 10,044,909 B2
(45) Date of Patent: Aug. 7, 2018

(54) IMAGE PROCESSING APPARATUS GENERATING CONVERSION TABLE USING INPUT-SIDE PROFILE AND OUTPUT-SIDE PROFILE

(71) Applicant: BROTHER KOGYO KABUSHIKI KAISHA, Nagoya, Aichi (JP)

(72) Inventor: Kazuhide Sawada, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 49 days.

(21) Appl. No.: 15/384,476

(22) Filed: Dec. 20, 2016

(65) Prior Publication Data
US 2017/0187925 A1 Jun. 29, 2017

(30) Foreign Application Priority Data
Dec. 25, 2015 (JP) .................................. 2015-253613

(51) Int. Cl.
*H04N 1/60* (2006.01)

(52) U.S. Cl.
CPC .................................. *H04N 1/6022* (2013.01)

(58) Field of Classification Search
CPC .. H04N 1/6022; H04N 1/6019; H04N 1/6016; H04N 1/6013; H04N 1/6011; H04N 1/603
See application file for complete search history.

(56) References Cited

U.S. PATENT DOCUMENTS 5,838,333 A 11/1998 Matsuo

FOREIGN PATENT DOCUMENTS

| JP | H08-235346 A | 9/1996 |
|----|--------------|--------|
| JP | 2014-120886 A | 6/2014 |

*Primary Examiner* — Christopher D Wait
(74) *Attorney, Agent, or Firm* — Scully, Scott, Murphy & Presser, PC

(57) ABSTRACT

An image processing apparatus specifies j number of input-side profiles from among J number of input-side profiles in a target file which has K number of sets of object data defining color in a specific color space. The J number of input-side profiles are for converting a value in the specific color space to a value in a first color space. A conversion table is generated using one of the j number of input-side profiles and an output-side profile, and for converting a value in the specific color space to a value in the second color space without generating a value in the first color space. The output-side profile is for converting a value in the first color space to a value in the second color space. The apparatus converts k number of sets of object data correlated to one of the j number of input-side profiles using the table.

14 Claims, 10 Drawing Sheets

FIG. 2
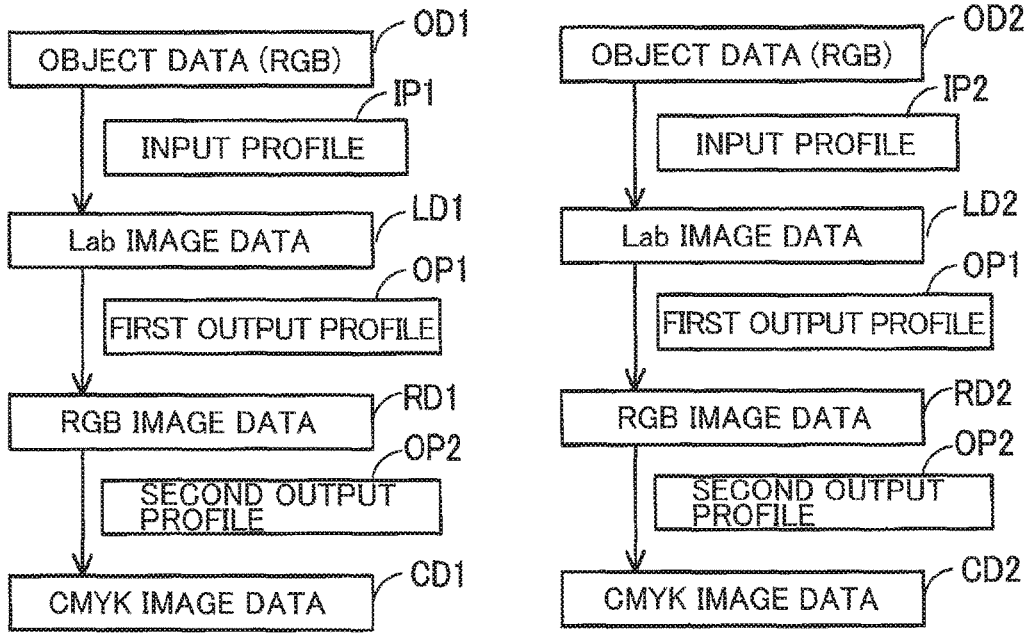
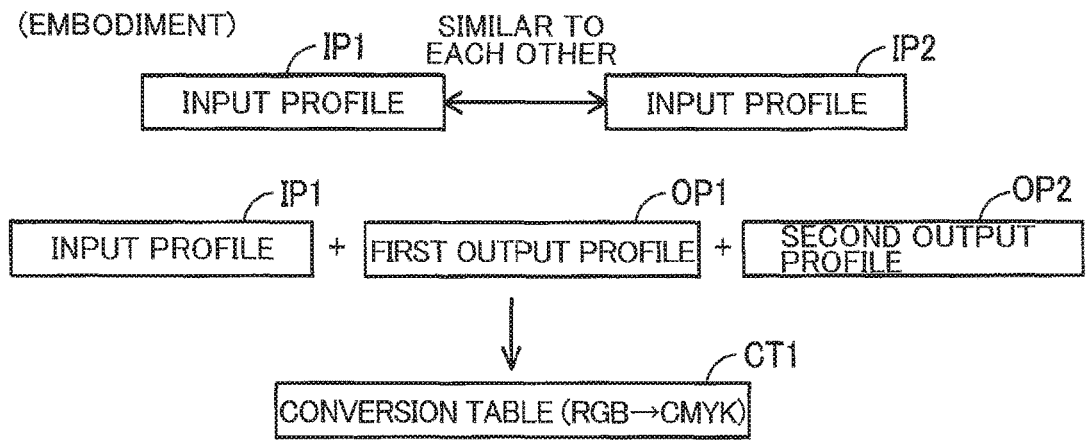
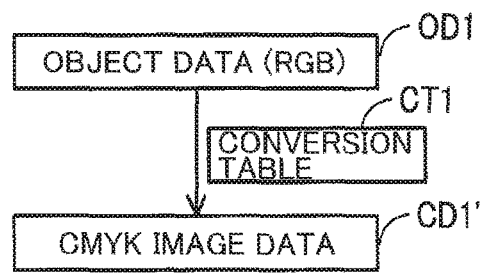
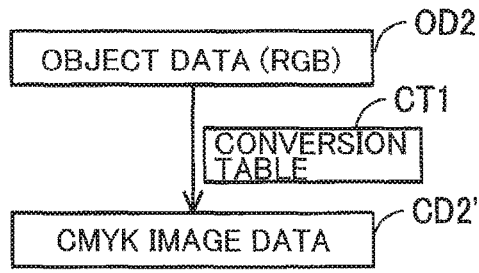

(CASE A: SIMILARITY INDEX VALUE IV > THRESHOLD VALUE)
S160: RECORD DATA IN PROCESS TABLE

PT

| GROUP ID | PROFILE ID | PROFILE DATA | DATA ID |
|---|---|---|---|
| G1 | 11obj | PD1 | 12obj |
| | 21obj | PD2 | 22obj |

(CASE B: SIMILARITY INDEX VALUE IV ≦ THRESHOLD VALUE)
S150: RECORD DATA IN PROCESS TABLE

PT

| GROUP ID | PROFILE ID | PROFILE DATA | DATA ID |
|---|---|---|---|
| G1 | 11obj | PD1 | 12obj |
| G2 | 21obj | PD2 | 22obj |

FIG. 7

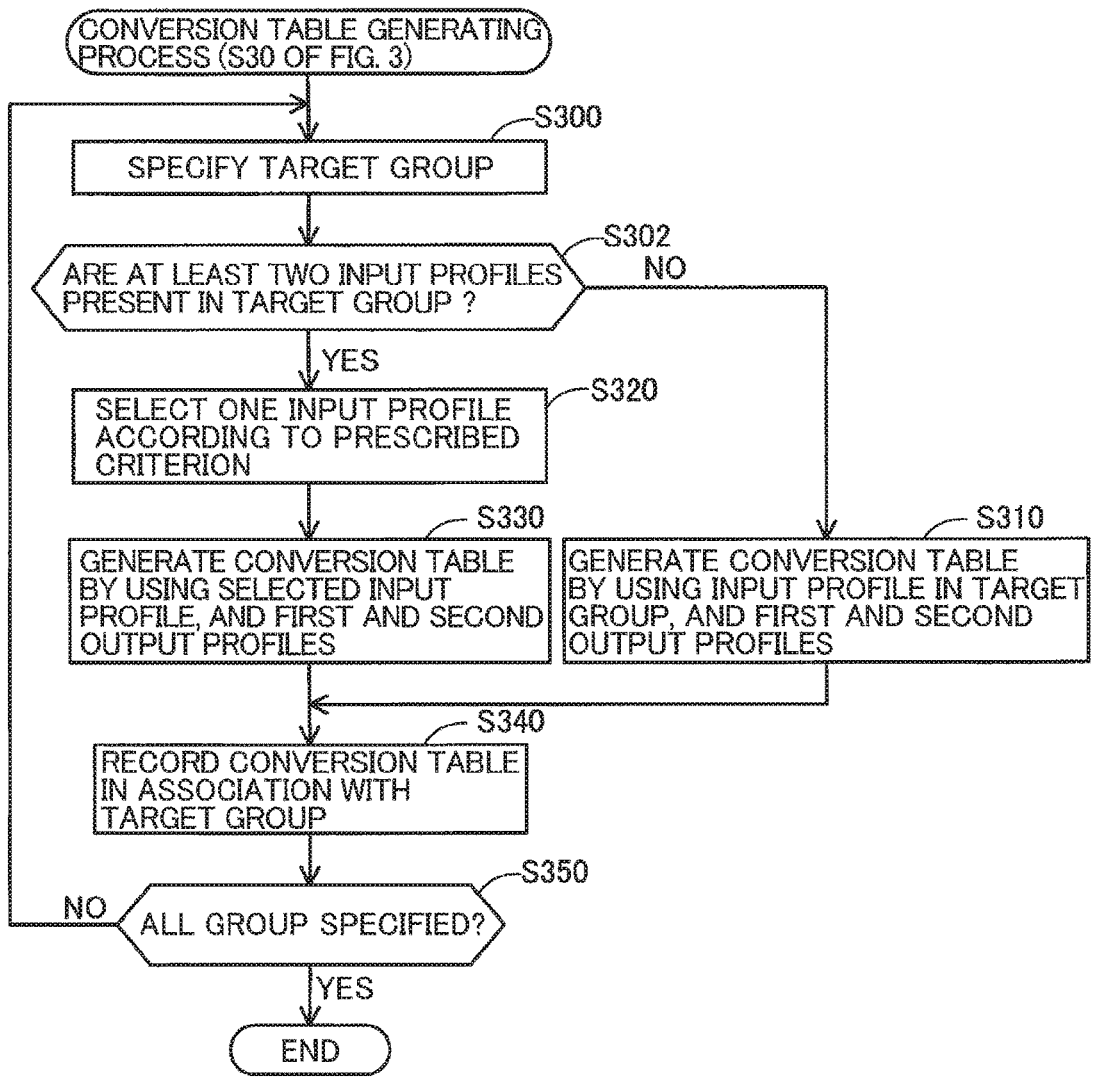

(PRESCRIBED CRITERION)
FIRST EMBODIMENT:
INPUT PROFILE ASSOCIATED WITH LARGEST NUMBER OF
SETS OF OBJECT DATA

SECOND EMBODIMENT:
INPUT PROFILE ASSOCIATED WITH OBJECT DATA
REPRESENTING LARGEST SIZE OF OBJECT

THIRD EMBODIMENT:
PRIORITY RANKING IMAGE→PATTERN→TEXT

FOURTH EMBODIMENT:
INPUT PROFILE ASSOCIATED WITH OBJECT DATA
REPRESENTING OBJECT HAVING LARGEST FRESH-COLORED REGION

FIG. 8
| GROUP ID | PROFILE ID | PROFILE DATA | DATA ID |
|---|---|---|---|
| G1 | 11obj | PD1 | 12obj |
| | 21obj | PD2 | 22obj |
| | 25obj | PD3 | 26obj, 30obj, 35obj |
| G2 | 41obj | PD4 | 42obj, 43obj |
| | 45obj | PD5 | 46obj, 47obj |
| G3 | 51obj | PD6 | 52obj |
PT
(GROUP G1)
PROFILE ID ASSOCIATED WITH LARGEST NUMBER OF DATA ID = 25obj
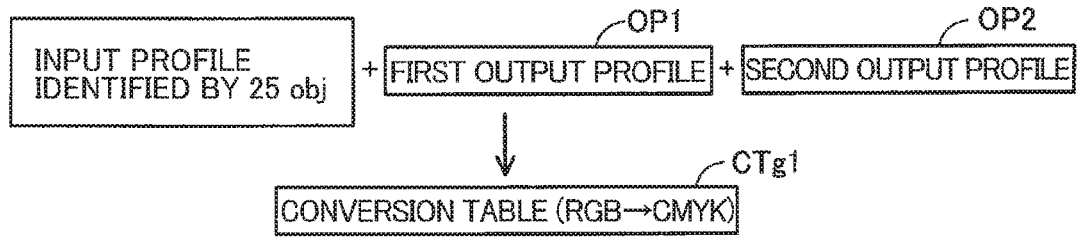
(GROUP G2)
PROFILE ID ASSOCIATED WITH LARGEST NUMBER OF DATA ID = 41obj, 45obj
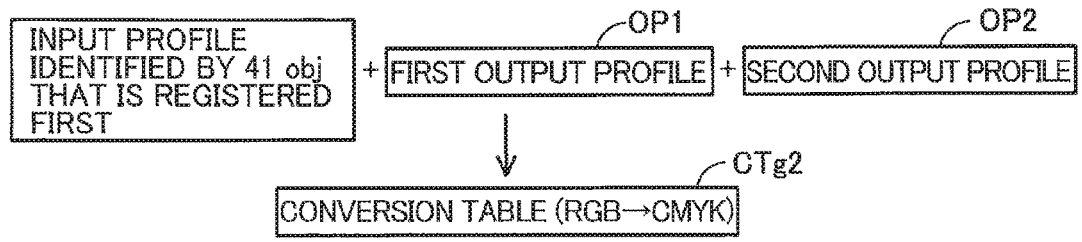
(GROUP G3)
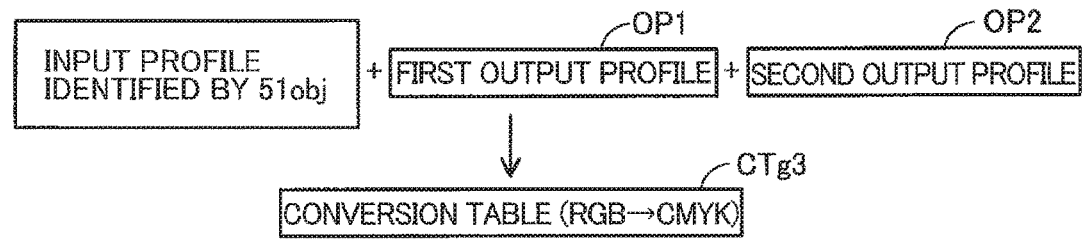

FIG. 10

(SECOND EMBODIMENT)

| GROUP ID | PROFILE ID | PROFILE DATA | DATA ID |
|---|---|---|---|
| G1 | 11obj | PD1 | 12obj |
| | 21obj | PD2 | 22obj |
| G2 | 41obj | PD4 | 42obj, 43obj |
| | 45obj | PD5 | 46obj |

(GROUP G1)
SIZE OF OBJECT obj 12 > SIZE OF OBJECT obj 22

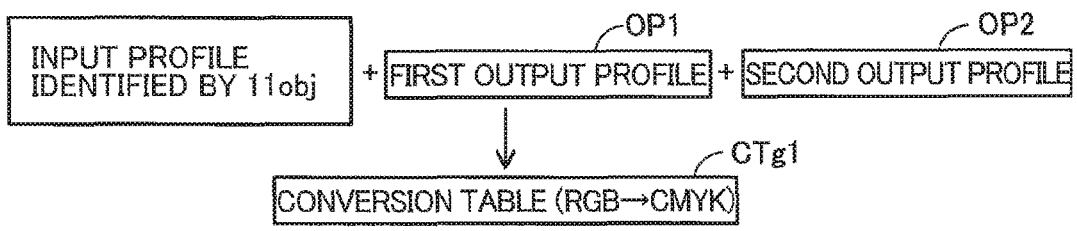

(GROUP G2)
TOTAL SIZE OF OBJECTS 42obj and 43 obj < SIZE OF OBJECT 46obj

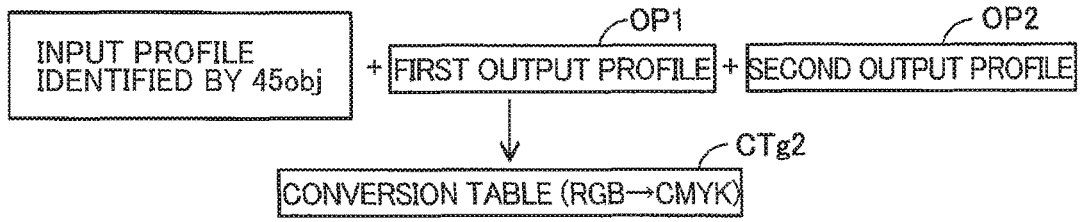

(THIRD EMBODIMENT)
(GROUP G1)
OBJECT 12obj = IMAGE
OBJECT 22 obj = TEXT (FOURTH EMBODIMENT)
(GROUP G1)
SIZE OF FRESH-COLORED REGION OF OBJECT 12obj >
SIZE OF FRESH-COLORED REGION OF OBJECT 22obj

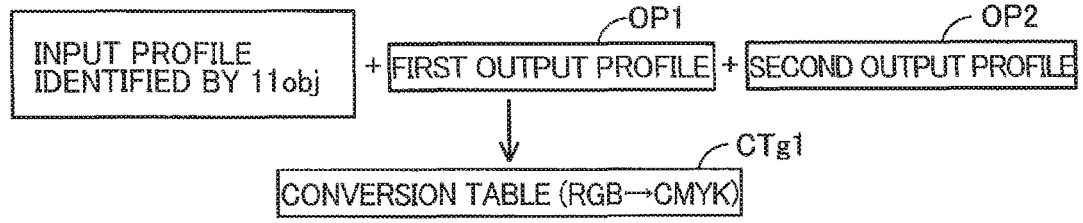

IMAGE PROCESSING APPARATUS GENERATING CONVERSION TABLE USING INPUT-SIDE PROFILE AND OUTPUT-SIDE PROFILE

CROSS REFERENCE TO RELATED APPLICATION

This application claims priority from Japanese Patent Application No. 2015-253613 filed Dec. 25, 2015. The entire content of the priority application is incorporated herein by reference.

TECHNICAL FIELD

The present disclosure relates to an image processing apparatus that performs color conversion on object data provided in a target file and outputs an image represented by the target file.

BACKGROUND

In a conventional method, when a printer acquires a PDF file, the printer performs a sequence of color conversion processes on object data in the PDF file using first an input-side profile provided in the PDF file and then an output-side profile stored on the printer. Next, the printer uses the image data produced from this color conversion to print an image represented by the PDF file.

SUMMARY

However, there is need for a technology capable of performing color conversion of object data more rapidly. Therefore, it is an object of the present disclosure to provide a technology that enables an image processing apparatus to perform rapid color conversion on object data in a target file.

In order to attain the above and other objects, the disclosure provides an image processing apparatus. The image processing apparatus includes processor and a memory storing computer-readable instructions therein. The computer-readable instructions, when executed by the processor, causes the image-processing apparatus to perform: acquiring a target file having K number of sets of object data and J number of input-side profiles where K is an integer larger than or equal to two and J is an integer larger than or equal to two, each of the K number of sets of object data defining color by a coordinate value in a specific color space, each of the K number of sets of object data being correlated to one of the J number of input-side profiles, each of the J number of input-side profiles including data for converting a coordinate value in the specific color space to a coordinate value in a first color space; specifying j number of input-side profiles from among the J number of input-side profiles where j is an integer larger than or equal to two and smaller than or equal to J; generating a conversion table by using at least one of the j number of input-side profiles and an output-side profile after the j number of input-side profiles are specified, the output-side profile including data for converting a coordinate value in the first color space to a coordinate value in the second color space, the conversion table including data for converting a coordinate value in the specific color space to a coordinate value in the second color space without generating a coordinate value in the first color space; generating k number of sets of partial image data by converting respectively k number of sets of object data using the conversion table where k is an integer larger than or equal to two and smaller than or equal to K, each of the k number of sets of object data among the K number of sets of object data being correlated to one of the j number of input-side profiles, each of the k number of sets of partial image data having a plurality of pixel values respectively representing a plurality of coordinate values in the second color space; and outputting an image represented by the target file using the k number of sets of partial image data.

According to another aspects, the disclosure provides a non-transitory computer readable storage medium storing a set of program instructions thereon that, when executed by a computer, cause the computer to perform operations including: acquiring a target file having K number of sets of object data and J number of input-side profiles where K is an integer larger than or equal to two and J is an integer larger than or equal to two, each of the K number of sets of object data defining color by a coordinate value in a specific color space, each of the K number of sets of object data being correlated to one of the J number of input-side profiles, each of the J number of input-side profiles including data for converting a coordinate value in the specific color space to a coordinate value in a first color space; specifying j number of input-side profiles from among the J number of input-side profiles where j is an integer larger than or equal to two and smaller than or equal to J; generating a conversion table by using at least one of the j number of input-side profiles and an output-side profile after the j number of input-side profiles are specified, the output-side profile including data for converting a coordinate value in the first color space to a coordinate value in the second color space, the conversion table including data for converting a coordinate value in the specific color space to a coordinate value in the second color space without generating a coordinate value in the first color space; generating k number of sets of partial image data by converting respectively k number of sets of object data using the conversion table where k is an integer larger than or equal to two and smaller than or equal to K, each of the k number of sets of object data among the K number of sets of object data being correlated to one of the j number of input-side profiles, each of the k number of sets of partial image data having a plurality of pixel values respectively representing a plurality of coordinate values in the second color space; and outputting an image represented by the target file using the k number of sets of partial image data.

BRIEF DESCRIPTION OF THE DRAWINGS

The particular features and advantages of the disclosure as well as other objects will become apparent from the following description taken in connection with the accompanying drawings, in which:

FIG. 2 is a schematic diagram illustrating an overview of a process of the first embodiment;

FIG. 7 is a flowchart illustrating a conversion table generating process shown in FIG. 3;

FIG. 8 is an explanatory diagram illustrating the conversion table generating process shown in FIG. 7;

FIG. 10 is an explanatory diagram illustrating processes of second to fourth embodiments.

DETAILED DESCRIPTION

First Embodiment

Structure of a Communication System 2

Figure 1:
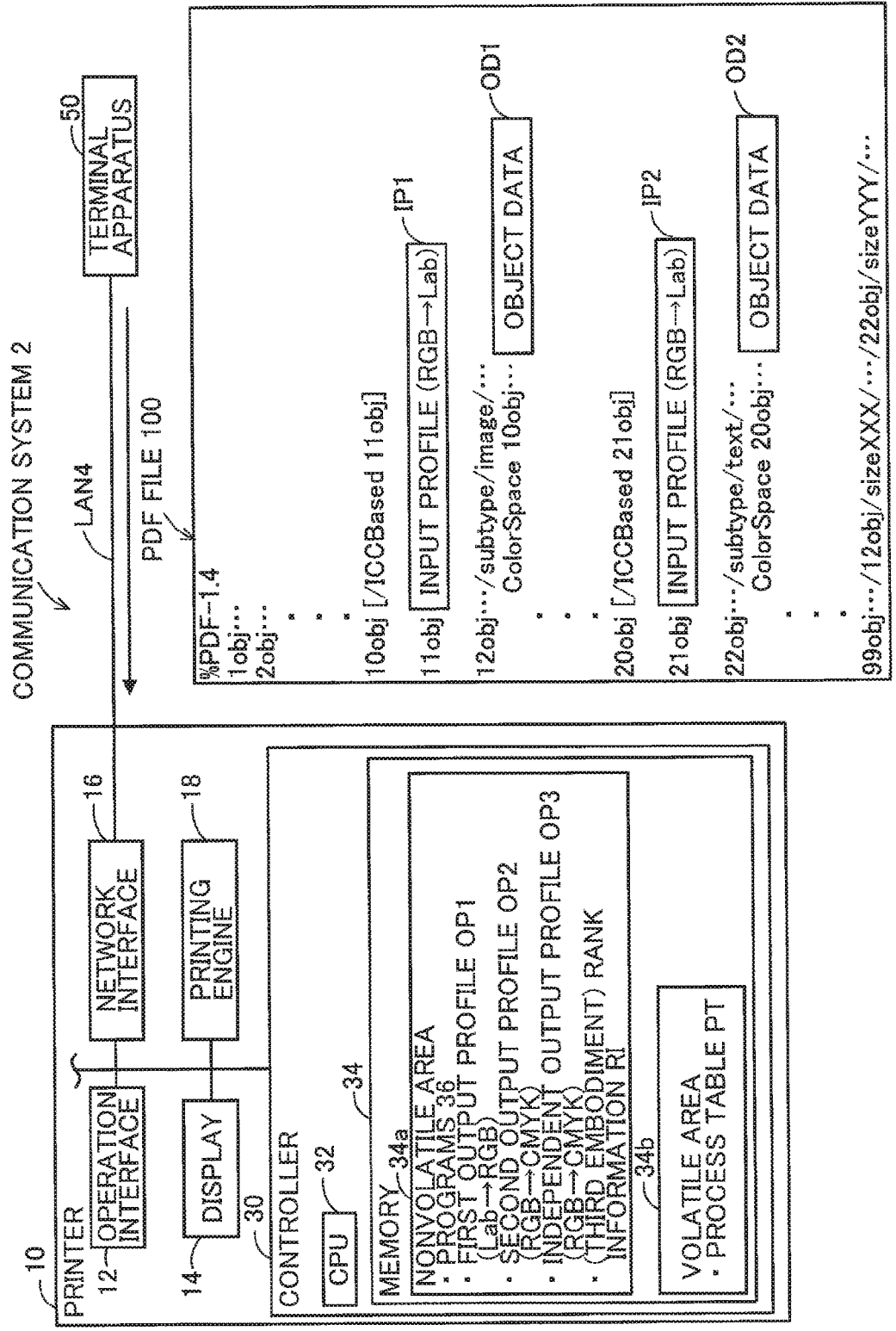
FIG. 1 is a block diagram illustrating a configuration of a communication system according to a first embodiment.

As shown in FIG. 1, a communication system 2 includes a printer 10, and a terminal apparatus 50. The printer 10 and the terminal apparatus 50 are connected to a local area network (LAN) 4 and can communicate with each other over the LAN 4. The LAN 4 may be wired or wireless. When the terminal apparatus 50 provides a PDF file 100 to the printer 10 via the LAN 4, for example, the printer 10 can print an image represented by the PDF file 100.

Structure of the Printer 10

The printer 10 is a peripheral apparatus (that is, an auxiliary apparatus that interacts with the terminal apparatus 50 and the like) that implements a printing function. The printer 10 includes an operating interface (IF) 12, a display 14, a network interface (IF) 16, a printing engine 18, and a controller 30 that are connected to each other via a bus line. The operating interface 12 is configured of a plurality of keys. The user can input various commands into the printer 10 by operating the operating interface 12. The display 14 is an apparatus that displays various types of information. The display 14 functions as a touchscreen. That is, the display 14 functions as an operating interface that the user can operate. The network interface 16 is connected to the LAN 4. The printing engine 18 is provided with an inkjet printing mechanism or a laser printing mechanism, for example.

The controller 30 includes a CPU 32, and a memory 34. The CPU 32 executes various processes according to programs 36 stored in the memory 34. The memory 34 is configured of one or a plurality of memory devices. The memory 34 includes a nonvolatile area 34a for storing information that is not lost when the power to the printer 10 is turned off, and a volatile area 34b for storing information that is lost when the power to the printer 10 is turned off. The information in the nonvolatile area 34a is stored at the factory prior to the printer 10 being shipped. Information is stored in the volatile area 34b as the CPU 32 is executing processes.

In addition to the programs 36, the nonvolatile area 34a stores a first output profile OP1, a second output profile OP2, and an independent output profile OP3. The first and second output profiles OP1 and OP2 are output-side International Color Consortium (ICC) profiles that are used together with an input profile IP1 included in the Portable Document Format (PDF) file 100. The independent output profile OP3 is an output-side ICC profile to be used alone, rather than together with the input profile IP1.

The first output profile OP1 includes data for sets of converting coordinate values in a device-independent color space that does not depend on the characteristics of a device to sets of coordinate values in a standard color space. The device-independent color space used in the embodiment is the L*a*b* color space, but the XYZ color space or the like may be used in a variation. Below, L*a*b* will be abbreviated as "Lab." Further, the standard color space is predetermined. The RGB color space is used as the standard color space in the embodiment, but another color space may be used as a variation.

The first output profile OP1 may be configured of a grid that correlates a plurality of sets of coordinate values ($17^3$ grid points, for example) in the Lab color space with a plurality of sets of coordinate values in the RGB color space, or may be represented by a function for converting sets of coordinate values in the Lab color space to sets of coordinate values in the RGB color space. The other output profiles OP2 and OP3 and the input profiles IP1 and the like are also expressed as grids or functions.

The second output profile OP2 includes data for converting sets of coordinate values in a standard color space (that is, the RGB color space), i.e., sets of coordinate values that have been converted from the Lab color space by the first output profile OP1, to sets of coordinate values in a device-dependent color space that depends on characteristics of the printer 10. The device-dependent color space for the printer 10 is the CMYK color space in the embodiment, but in a variation of the embodiment may be a color space having more colors than the four CMYK colors (the six colors CMYK plus orange and green; or eight colors, for example).

The independent output profile OP3 includes data for converting sets of coordinate values in a standard color space (that is, the RGB color space) to sets of coordinate values in a device-dependent color space that depends on characteristics of the printer 10 (that is, the CMYK color space).

Both the output profiles OP2 and OP3 described above convert sets of coordinate values in the RGB color space to sets of coordinate values in the CMYK color space, but these profiles have the following differences. In the second output profile OP2, the C value is only dependent on the R value and not the G and B values. Similarly, the M and Y values are only dependent on the G and B values, respectively. Thus, each of the CMY values is dependent only on one of the RGB values in the second output profile OP2. In the independent output profile OP3, on the other hand, each of the CMY values is dependent on two or more of the RGB values. Note that the output profiles OP2 and OP3 may be the same profile in a variation of the embodiment.

The volatile area 34b stores a process table PT that is produced when the CPU 32 executes the process of FIG. 2 described later. The process table PT is used for performing color conversion on object data OD1 and the like stored in the PDF file 100.

Structure of the PDF File 100

The PDF file 100 includes object identifiers, such as "1obj", "2obj", and the like and an entry describing the object identified by each object identifier. For example, the entry "/ICCBased 11obj" is provided for "10obj". This signifies that the input profile IP1 entered as the description for identifier "11obj" is an input-side ICC profile. The entry provided for object identifier "12obj" includes "ColorSpace 10obj" and the object data OD1. This signifies that color conversion should be performed on the object data OD1 using the input profile defined in "10obj", i.e., the input profile IP1 entered as the description for "11obj." In other words, the content described in "10obj"-"12obj" correlates the input profile IP1 with the object data OD1 on which color conversion using the input profile IP1 is to be performed.

Similarly, an input profile IP2 and the object data OD2 are correlated in the entries for "20obj"-"22obj." Note that correlations are not limited to those between only a single input profile, such as the input profile IP1, and a single set of object data, such as the object data OD1. For example, two or more sets of object data including the object data OD1 may be correlated with the input profile IP1. Further, all sets of object data do not necessarily be correlated with any input profile. There may exist object data with which no input profile has been associated. With this configuration, the PDF file 100 may include a plurality of sets of object data and a plurality of input profiles, and the plurality of sets of object data may include a set of object data with which input profiles have been correlated and a set of object data with which input profiles have not been correlated.

Each of the input profiles IP1 and IP2 includes data for converting sets of coordinate values in a device-dependent color space (the RGB color space in the embodiment) that is dependent on characteristics of the device generating the PDF file 100 (the terminal apparatus 50, for example) to sets of coordinate values in a device-independent color space (i.e., the Lab color space).

Each set of the object data OD1 and OD2 specifies colors defined by sets of coordinate values in the device-dependent color space (i.e., the RGB color space) for the device that generated the PDF file 100. Each set of the object data OD1 and OD2 may be bitmap data (i.e., an image object) configured by a plurality of pixels specifying sets of coordinate values in the RGB color space, may be text format data (i.e., a text object), or may be data of another format (for example, data for defining a tile pattern or data for drawing a graph).

Further, the description "subtype/image" and the object data OD1 are entered for "12obj." This signifies that the type of the object data OD1 is an image object. Similarly, the description "subtype/text" and the object data OD2 are entered for "22obj." This signifies that the type of the object data OD2 is a text object.

Further, the description "12obj/sizeXXX" is entered for "99obj." This signifies that the size of the object represented by the object data OD1 entered as the description for "12obj" is "XXX." This size does not denote the pixel number of the object data OD1, but rather the height and width of the object in the image represented by the PDF file 100. Similarly, the size of the object image represented by the object data OD2 is "YYY" as indicated in the description for "99obj."

Overview of the Embodiment

Next, the method in which the printer 10 prints an image represented by the PDF file 100 will be described with reference to FIG. 2. Prior to describing the method of the embodiment, a method for comparison will be described.

In the comparative example, the printer generates Lab image data LD1 by converting the object data OD1 using the input profile IP1, generates RGB image data RD1 by converting the Lab image data LD1 using the first output profile OP1, and generates CMYK image data CD1 by converting the RGB image data RD1 using the second output profile OP2. The printer similarly generates data LD2, RD2, and CD2 from the object data OD2 through sequential conversions using the profiles IP2, OP1, and OP2. Thus, the method of the comparative example requires three conversion processes for each set of object data, which can lengthen the time for printing.

In the method of the embodiment, the printer 10 executes the following process when, for example, the two input profiles IP1 and IP2 are similar to each other. Specifically, the printer 10 calculates a plurality of sets of CMYK coordinate values by converting a plurality of predetermined sets of RGB coordinate values using the input profile IP1, the first output profile OP1, and the second output profile OP2 in sequence and generates a conversion table CT1 that correlates the plurality of predetermined sets of RGB coordinate values with the plurality of sets of CMYK coordinate values. Next, the printer 10 uses the conversion table CT1 to convert the object data OD1 and OD2 respectively associated with the similar input profiles IP1 and IP2 to generate corresponding CMYK image data CD1' and CD2' directly, without needing to convert the object data to a set of coordinate values in the Lab color space or convert the set of coordinate values in the Lab space to a set of coordinate values in the RGB color space. Here, the object data OD2 is not converted using the input profile IP2, but is converted using the conversion table CT1 having the conversion characteristics of the input profile IP1, which is similar to the input profile IP2. Therefore, the CMYK image data CD2' can accurately render colors in the image represented by the object data OD2. The method of the embodiment requires some time to generate the conversion table CT1 using the input profile IP1, but eliminates the need to perform three conversion processes for each set of object data. Hence, the method of the embodiment can shorten the time required for printing from that required in the comparative example.

Note that after generating each of the sets of CMYK image data CD1' and CD2', the printer 10 executes a halftone process on the multi-level (256 gradations, for example) pixel values in the CMYK image data CD1' and CD2' to produce respective sets of CMYK image data (hereinafter called "print data") having relatively few gradations (two or three levels, for example). Next, the printer 10 supplies the print data to the printing engine 18, instructing the printing engine 18 to print an image represented by the print data, i.e., the image represented by the PDF file 100.

Printing Process

Next, steps in a printing process executed by the CPU 32 of the printer 10 will be described with reference to FIG. 3. The CPU 32 continuously executes the process of FIG. 3 while the power to the printer 10 is on. In S10 of FIG. 3, the CPU 32 monitors the network interface 16 to determine whether a PDF file 100 has been acquired from the terminal apparatus 50 via the network interface 16. The CPU 32 advances to S20 when a PDF file 100 has been acquired (S10: YES).

In S20 the CPU 32 executes a grouping process for grouping together the input profile IP1 and other input profiles in the PDF file 100 that resemble each other (described later with reference to FIG. 4). Through the grouping process, the CPU 32 generates the process table PT in the volatile area 34b (see FIG. 1).

In S30 the CPU 32 executes a conversion table generating process (described later with reference to FIG. 7) for generating a conversion table (see the conversion table CT1 in FIG. 2) for each group identified in S20. Through the conversion table generating process, the CPU 32 generates a conversion table for each group in the process table PT.

Figure 9:
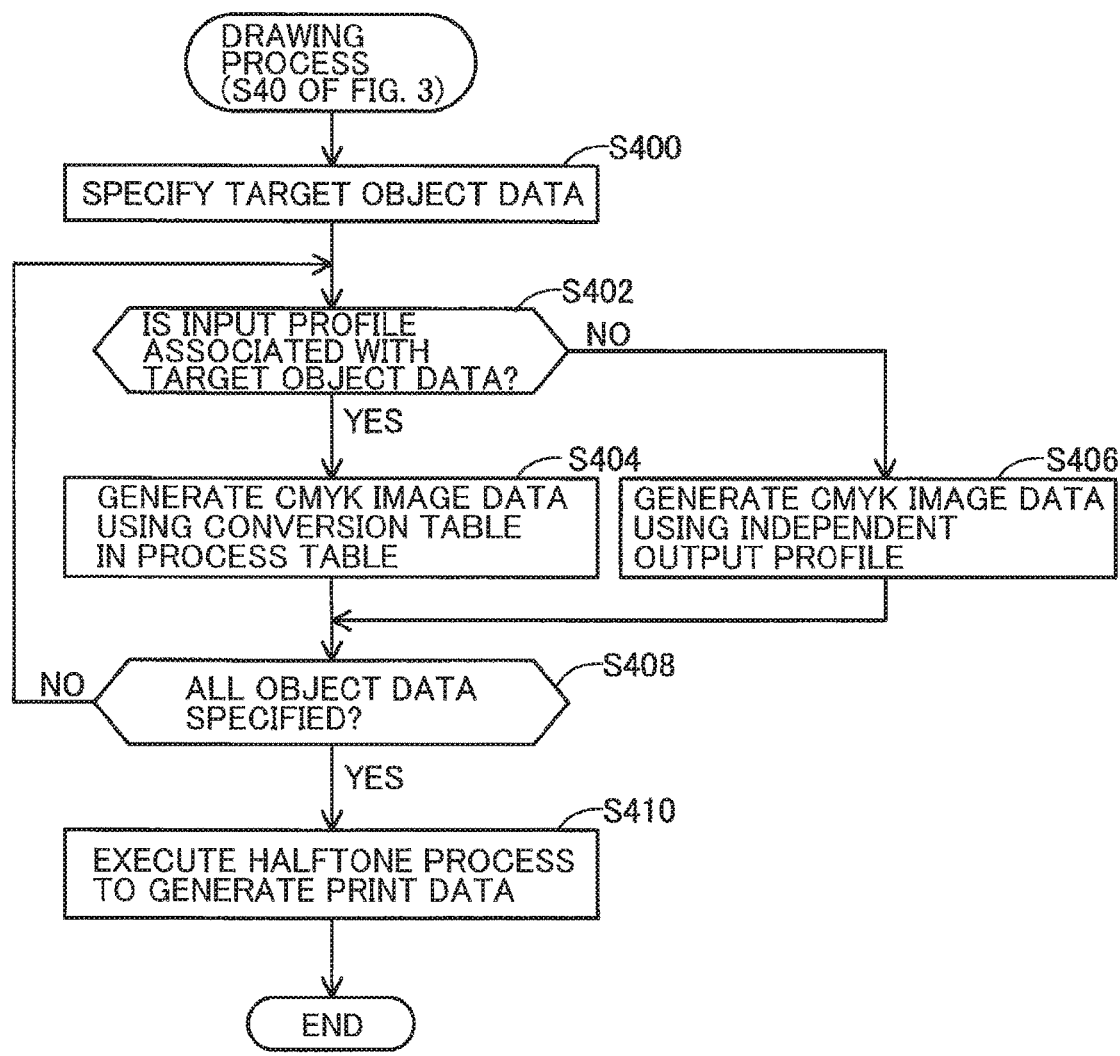
FIG. 9 is a flowchart illustrating a drawing process shown in FIG. 3.

In S40 the CPU 32 executes a drawing process (described later with reference to FIG. 9). The drawing process includes a process for generating CMYK image data from all the sets of object data using the conversion tables generated in S30, a process for generating print data, and the like.

In S50 the CPU 32 supplies the print data generated in S40 to the printing engine 18 and controls the printing engine 18 to print an image represented by the print data.

In S60 the CPU 32 deletes the process table PT and each of the conversion tables that were generated in S20 and S30, respectively, from the volatile area 34b. Hence, all information in the process table PT generated on the basis of the PDF file 100 is not used for printing other PDF files. After completing step S60, the process of FIG. 3 ends.

Grouping Process

Next, steps in the grouping process executed in S20 of FIG. 3 will be described with reference to FIG. 4. While not shown in FIG. 4, the CPU 32 first generates the process table PT in the volatile area 34*b* at the beginning of the process in FIG. 4. As shown in FIG. 5, the process table PT holds records of correlating information correlating group IDs, profile IDs, profile data, and data IDs. The group IDs and the profile IDs serve to identify groups and input profiles, respectively. Profile data is the data generated from input profiles. The data IDs serve to identify object data associated with the input profiles. When the process table PT is first generated, correlating information has not yet been recorded in the process table PT.

Figure 4:
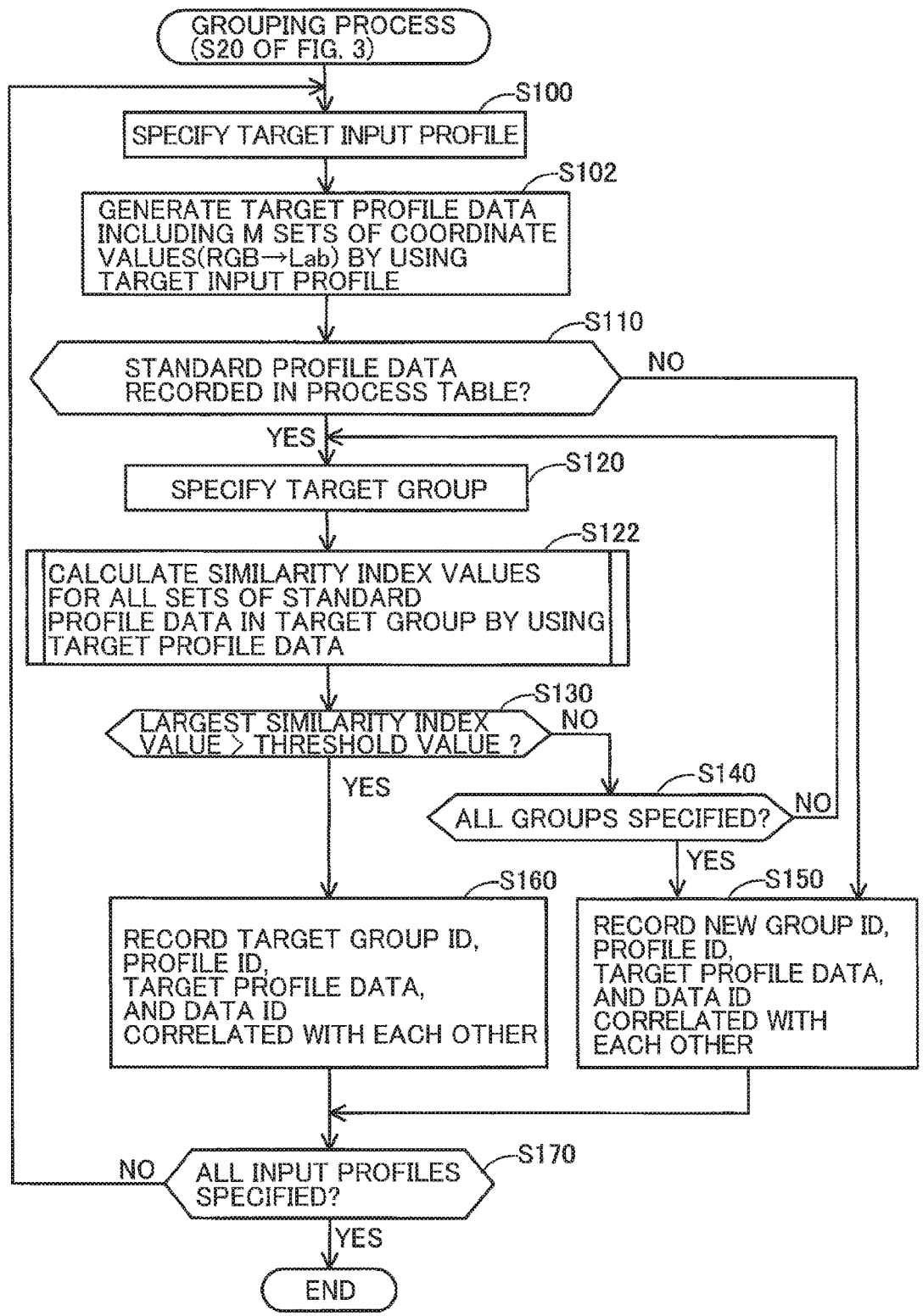
FIG. 4 is a flowchart illustrating a grouping process shown in FIG. 3.
Figure 5:
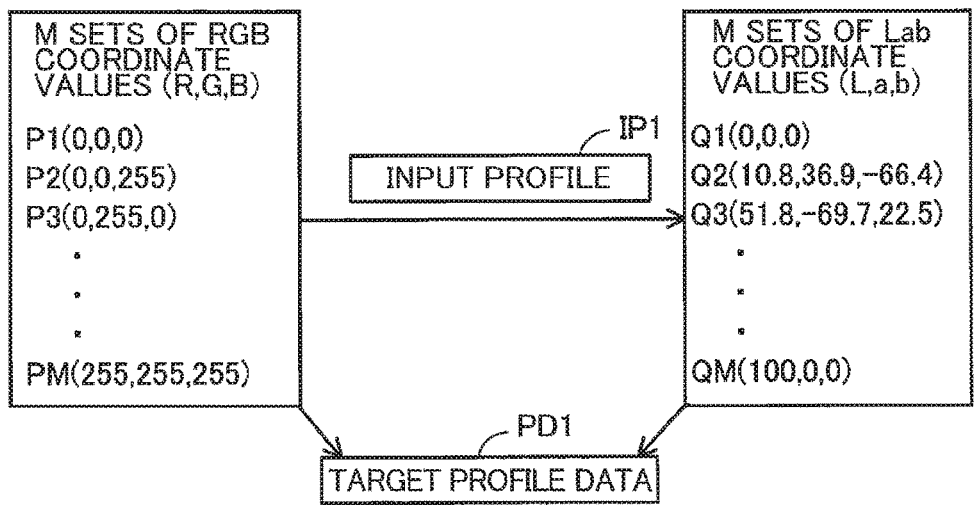
FIG. 5 is an explanatory diagram illustrating the grouping process shown in FIG. 4.

In S100 of FIG. 4, the CPU 32 searches each object identifier in the PDF file 100 in ascending order and specifies a single input profile for the detected object identifier (the input profile IP1 in FIG. 1, for example). In the following description, the specified input profile will be called the "target input profile."

In S102 the CPU 32 uses the target input profile identified in S100 to generate target profile data that includes M number of sets of coordinate value data where M is an integer of 2 or greater. More specifically, as illustrated in the example of S100 in FIG. 5, the CPU 32 uses the input profile IP1 as the target input profile to convert M number of predetermined sets of RGB coordinate values P1-PM to M number of sets of Lab coordinate values Q1-QM.

For example, assuming the target input profile is a function-type profile, the CPU 32 calculates a set of Lab coordinate values by plugging one set of RGB coordinate values targeted for conversion into the function. As another example, the target input profile may be a grid-type profile. In this case, when the target input profile includes one set of RGB coordinate values that matches one set of RGB coordinate values to be converted, the CPU 32 identifies a set of Lab coordinate values correlated with the set of RGB coordinate values in the target input profile. However, when the target input profile does not include one set of RGB coordinate values matching that to be converted, the CPU 32 executes an interpolation process using one or more sets of RGB coordinate values in the target input profile that are near each set of RGB coordinate value being converted in order to calculate a corresponding set of Lab coordinate values. Note that when the target input profile is a grid-type profile, the value of M is preferably a smaller value (256, for example) than the number of grid points in the target input profile ($17^3$, for example). In this way, the CPU 32 can more quickly execute a process described later for determining similarity (or, similarity index value calculating process) (see S122 and S130 of FIG. 4) than if the target input profile itself were recorded in the process table PT. However, the CPU 32 may record the target input profile itself in the process table PT in a variation of the embodiment.

After acquiring the M number of sets of Lab coordinate values Q1-QM, the CPU 32 generates target profile data PD1 having coordinate value data that correlates the M number of sets of RGB coordinate values P1-PM with the M number of sets of Lab coordinate values Q1-QM.

Note that the M number of sets of RGB coordinate values P1-PM include at least one set of coordinate values specifying achromatic colors (for example, P1(0, 0, 0) and PM(255, 255, 255)). As described with reference to FIG. 2, the printer 10 of the embodiment can convert the object data OD2 using the conversion table CT1 that includes conversion characteristics of the input profile IP1 rather than converting the object data OD2 using the input profile IP2 associated with the object data OD2. Thus, if a configuration were employed for determining whether two input profiles IP1 and IP2 are similar without regard for their achromatic-related conversion characteristics, conversion characteristics that differ greatly from the conversion characteristics related to achromatic colors in the input profile IP2 could be reflected in the object data OD2, that is, conversion characteristics related to achromatic colors in the input profile IP1 could be reflected. Since conversion characteristics related to achromatic colors have a greater impact on converted colors than other colors, the converted colors obtained from the object data OD2 could differ greatly from the colors actually defined in the PDF file 100. To avoid this occurrence, the CPU 32 in the embodiment uses the sets of coordinate values P1 and PM specifying achromatic colors to generate the target profile data PD1. In this way, the CPU 32 can consider achromatic-related conversion characteristics when determining whether two input profiles IP1 and IP2 are similar. As a result, the CPU 32 can suppress the output (i.e., printing) of colors that differ greatly from the colors actually defined in the PDF file 100. Note that a set of coordinate values specifying achromatic colors may be omitted from the M number of sets of RGB coordinate values P1-PM in a variation of the embodiment.

In S110 of FIG. 4, the CPU 32 determines whether at least one record of standard profile data is recorded in the process table PT. Standard profile data denotes profile data present in the process table PT when the CPU 32 reaches S110. Since information has not yet been recorded in the process table PT the first time the CPU 32 performs the process of S110 (S110: NO), the CPU 32 advances to S150.

In S150 the CPU 32 records new correlating information in the process table PT. More specifically, the CPU 32 generates a new group ID for identifying a new group. The CPU 32 sets the profile ID to the object identifier ("11ojb", for example) of the target input profile (the input profile IP1, for example) in the PDF file 100. The CPU 32 also searches the PDF file 100 to identify the object identifier ("12obj", for example) for the object data (the object data OD1, for example) associated with the target input profile (the input profile IP1, for example) and sets the data ID to the detected object identifier. If a plurality of sets of object data is correlated with the target input profile, the CPU 32 detects all of the object identifiers, and sets each of the detected object identifiers as a data ID. Next, the CPU 32 records new correlating information in the process table PT correlating the group ID generated above, the profile ID set above, the target profile data generated in S102, and the data IDs set above. In the example of FIG. 5, the new correlating information recorded in the process table PT includes the group ID G1, the profile ID "11obj", the profile data PD1, and the data ID "12obj". After completing the process in S150, the CPU 32 advances to S170.

In S170 the CPU 32 determines whether all input profiles in the PDF file 100 have been specified in S100. Specifically, the CPU 32 determines whether other input profiles are recorded in the PDF file 100 subsequent to the most recent target input profile. The CPU 32 ends the process in FIG. 4 when there is no other input profile (S170: YES). The CPU 32 repeats the process in S100-S110 described above when confirming that another input profile is recorded in the PDF file 100 (S170: NO).

The second and subsequent times that the CPU 32 executes the process of S110, at least one record of profile data is recorded in the process table PT. Accordingly, in S110 the CPU 32 determines that at least one record of standard profile data is recorded in the process table PT (S110: YES) and advances to S120.

In S120 the CPU 32 specifies one group by referencing the process table PT. More specifically, the CPU 32 specifies a group ID (the group ID G1 in the example of FIG. 5). In the following description, the group ID specified in S120 and the group itself will be respectively called the "target group ID" and the "target group."

Figure 6:
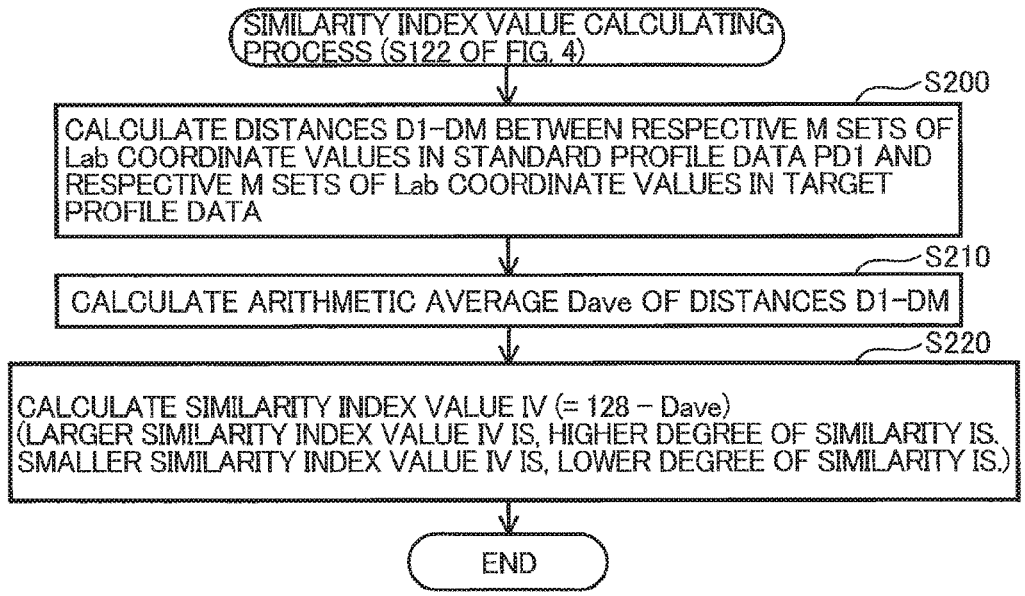
FIG. 6 is a diagram including a flowchart illustrating a similarity index value calculating process and an explanatory diagram illustrating sample cases A and B in which similarity index values are different from each other.

In S122 the CPU 32 uses the target profile data to calculate a similarity index value for each set of standard profile data in the target group. Next, the similarity index value calculating process of S122 will be described while referring to the flowchart in FIG. 6. In the example of FIG. 6, the input profile IP2 is set as the target input profile (S100); the target profile data PD2 is set to the profile data generated from the input profile IP2 (S102); the group identified by the group ID G1 is the target group (S120); and the profile data PD1 correlated with the group ID G1 (see FIG. 5) is the standard profile data.

In S200 of the similarity index value calculating process, the CPU 32 calculates the distance (i.e., the Euclidean distance) between the set of Lab coordinate values in the target profile data PD1 calculated from one set of RGB coordinate values and the set of Lab coordinate values in the target profile data PD2 calculated from the same one set of RGB coordinate values for each of the M number of sets of RGB coordinate values P1-PM (see FIG. 5) used for calculating the profile data. The resulting distances calculated in S200 are M number of distances D1-DM.

In S210 the CPU 32 calculates the arithmetic average $D_{ave}$ of the M number of distances D1-DM. The larger the arithmetic average $D_{ave}$, the greater the difference in conversion characteristics between the two sets of target profile data PD1 and PD2.

In S220 the CPU 32 calculates a similarity index value IV by subtracting the arithmetic average $D_{ave}$ from a predetermined value (128 in the embodiment). The larger the similarity index value IV, the smaller the difference in conversion characteristics between the two sets of target profile data PD1 and PD2 and the greater the similarity between the two sets of target profile data PD1 and PD2 (i.e., the input profiles IP1 and IP2). After completing the process in S220, the process of FIG. 6 ends.

When a plurality of records of standard profile data is present in the process table PT in association with the target group ID, in S122 of FIG. 4 the CPU 32 calculates one similarity index value IV for each of the records of standard profile data. Note that while reference numbers PD1 and PD2 are indicated in the flowchart of FIG. 6, similarity index values IV are calculated in the same way for other profile data. After completing the process of S122 in FIG. 4, the CPU 32 advances to S130.

In S130 the CPU 32 determines whether the largest similarity index value among the one or more similarity index values calculated in S122 is greater than a predetermined threshold value (120, for example). If the largest similarity index value is greater than the threshold value (S130: YES), the CPU 32 determines that standard profile data similar to the target profile data exists in the target group and advances to S160. That is, the CPU 32 determines that the standard profile corresponding to the largest similarity index is similar to the target profile data.

In S160 the CPU 32 records the new correlating information in the process table PT. More specifically, the CPU 32 first sets the profile ID to the object identifier ("21obj", for example) for the target input profile (the input profile IP2, for example) in the PDF file 100. Next, the CPU 32 searches the PDF file 100 to identify the object identifier ("22obj", for example) for the object data (the object data OD2, for example) associated with the target input profile (the input profile IP2, for example) and sets the data ID to the identified object identifier. If a plurality of sets of object data is correlated with the target input profile, the CPU 32 detects all of the object identifiers, and sets each of the detected object identifiers as a data ID. Next, the CPU 32 records new correlating information in the process table PT that correlates the target group ID, the profile ID set above, the target profile data generated in S102, and the data ID set above. In the example of Case A in FIG. 6, the new correlating information recorded in the process table PT includes the group ID G1, the profile ID "21obj", the target profile data PD2, and the data ID "22obj". After completing step S160, the CPU 32 advances to S170 described above.

On the other hand, if the CPU 32 determines in S130 that the largest similarity index value is smaller than or equal to the threshold value (S130: NO), the CPU 32 determines that standard profile data similar to the target profile data does not exist in the target group, and advances to S140.

In S140 the CPU 32 determines whether all groups in the process table PT have been specified in S120. When there remains a group in the process table PT that have not been identified (S140: NO), the CPU 32 repeats the process in S120-S130 described above. However, when all groups in the process table PT have been identified (S140: YES), the CPU 32 advances to S150 described above. Through this process, the CPU 32 records new correlating information in the process table PT that includes a new group ID and the like. In the example of Case B of FIG. 6, the CPU 32 has recorded new correlating information that includes the group ID G2, the profile ID "21obj", the profile data PD2, and the data ID "22obj".

After repeating the process in S100-S160 until reaching a YES determination in S170, the CPU 32 has recorded correlating information in the process table PT for all input profiles in the PDF file 100. As a result, the CPU 32 has completed creation of a process table PT in which similar input profiles have been grouped together.

Conversion Table Generating Process

Next, steps in the conversion table generating process executed in S30 of FIG. 3 will be described with reference to FIG. 7. In S300 of the process, the CPU 32 specifies a target group (i.e., a target group ID), as in S120 of FIG. 4.

In S302 the CPU 32 determines whether two or more input profiles are present in the target group. Specifically, the CPU 32 advances to S320 when two or more profile IDs are correlated with the target group identifier (S302: YES). The CPU 32 advances to S310 when only one profile ID is correlated with the target group identifier (S302: NO). As shown in either Case A or Case B of FIG. 6, assume that the group ID G1 is set as the target group ID in the process table PT for example. In Case A, the CPU 32 would reach a YES determination in S302 since two profile IDs "11obj" and "21obj" are associated with the group ID G1. However, in Case B the CPU 32 would reach a NO determination in S302 since "11obj" is the only profile ID associated with the group ID G1.

In S310 the CPU 32 generates a conversion table using the input profile (the input profile IP1, for example) identified by the single profile ID in the target group ("11obj" in Case B of FIG. 6, for example). Specifically, the CPU 32 sequentially uses the input profile, the first output profile OP1, and the second output profile OP2 to convert the plurality ($17^3$, for example) of sets of predetermined RGB coordinate values to a plurality of sets of CMYK coordinate values. Next, the CPU 32 generates a conversion table correlating the plurality of sets of RGB coordinate values with the plurality of sets of CMYK coordinate values. As described above, the CPU 32 generates a conversion table by sequentially performing conversions using the input profile and each of the first and second output profiles OP1 and OP2. Accordingly, the resulting conversion table has conversion characteristics of the input profile and conversion characteristics of the first and second output profiles OP1 and OP2. Here, "conversion characteristics" denotes the relationship between the set of pre-converted coordinate values and the set of converted coordinate values. In the case of grid-type profiles, the conversion characteristics signify the relationship between a set of coordinate values in a certain color space and a set of coordinate values in a different color space corresponding to the set of coordinate values in the first color space. Further, the expression "the conversion table has conversion characteristics of each profile" signifies that the set of CMYK coordinate values obtained by sequentially using the input profile and the first and second output profiles OP1 and OP2 to convert the set of RGB coordinate values are substantially equivalent to the set of CMYK coordinate values obtained by converting the set of RGB coordinate values using this conversion table. After completing the process in S310, the CPU 32 advances to S340.

In S320, on the other hand, the CPU 32 selects one of the input profiles according to a prescribed criterion from the two or more input profiles (the input profiles IP1 and IP2, for example) identified by the two or more profile IDs in the target group ("11obj" and "21obj" in Case A of FIG. 6, for example). The prescribed criterion in the embodiment is to select the input profile associated with the largest number of sets of object data in the process table PT (hereinafter called the "predominant input profile").

Using the example of the process table PT in FIG. 8, group G1 includes three input profiles identified by the three profile IDs "11obj", "21obj", and "25obj". One data ID is correlated with each of the profile IDs "11obj" and "21obj", while three data IDs are correlated with the profile ID "25obj". When group G1 is set as the target group, in S320 of FIG. 7 the CPU 32 selects the profile ID "25obj" associated with the largest number of data IDs as the predominant input profile.

Group G2 in the example of FIG. 8 includes two input profiles identified by the two profile IDs "41obj" and "45obj". Two data IDs are correlated with each of the profile IDs "41obj" and "45obj". Consequently, there are two predominant input profiles when group G2 is the target group. In this case, in S320 of FIG. 7 the CPU 32 selects the predominant input profile that is registered first, i.e., the input profile identified by the profile ID "41obj". As a variation of the embodiment, the CPU 32 may select the predominant input profile that is registered last, i.e., the input profile identified by the profile ID "45obj" in this case, or may randomly select one of the input profiles from the two predominant input profiles.

After completing the process in S320 of FIG. 7, in S330 the CPU 32 generates a conversion table using the input profile selected in S320. S330 is identical to S310. When group G1 in the example of FIG. 8 is the target group, the CPU 32 uses the input profile identified by the profile ID "25obj" to generate a conversion table CTg1. When group G2 of FIG. 8 is the target group, the CPU 32 uses the input profile identified by the profile ID "41obj" to generate a conversion table CTg2.

Note that a group G3 in the example of FIG. 8 includes only one input profile identified by the single profile ID "51obj". In this case, the CPU 32 reaches a NO determination in S302 of FIG. 7, as described above, and in S310 uses the input profile identified by the profile ID "51obj" to generate a conversion table CTg3. After completing the process in S310 or S330, the CPU 32 advances to S340.

In S340 the CPU 32 records the conversion table generated in S310 or S330 in the process table PT in association with the target group ID. Accordingly, the conversion table is correlated with all the data IDs of the target group ID in the process table PT. This signifies that object data identified by these data IDs are to be converted using the corresponding conversion table.

In S350 the CPU 32 determines whether all groups in the process table PT have been specified in S300. When there remains a group in the process table PT that has not yet been specified (S350: NO), the CPU 32 repeats the process described above in S300-S340. However, when all groups in the process table PT have been specified (S350: YES), the CPU 32 ends the process of FIG. 7.

Drawing Process

Next, steps in the drawing process executed in S40 of FIG. 3 will be described with reference to FIG. 9. In S400 the CPU 32 searches each object identifier in the PDF file 100 in ascending order to specify one set of object data (the object data OD1 in FIG. 1, for example). Specifically, the CPU 32 specifies one object identifier for the object data ("12obj" in FIG. 1, for example). In the following description, the specified object data and its object identifier will be called the "target object data" and "target object identifier," respectively.

In S402 the CPU 32 determines whether an input profile has been associated with the target object data. Specifically, the CPU 32 advances to S404 when the entry for the target object identifier includes a character string identifying an input profile ("ColorSpace 10obj" in FIG. 1, for example; S402: YES). The CPU 32 advances to S406 when the entry for the target object identifier does not include such a character string (S402: NO).

In S404 the CPU 32 acquires the conversion table associated with the data ID matching the target object identifier identified in S400 in the process table PT. Next, the CPU 32 uses the conversion table acquired above to convert the target object data specified in S400, thereby generating CMYK image data that includes a plurality of pixels specifying a plurality of sets of coordinate values in the CMYK color space.

For example, when the target object identifier matches the data ID "12obj" in group G1 of FIG. 8, the CPU 32 uses the conversion table CTg1 to convert the object data OD1 into CMYK image data. As another example, when the target object identifier matches the data ID "22obj" in group G1, the CPU 32 uses the conversion table CTg1 to convert the object data OD2 into CMYK image data. After completing the process in S404, the CPU 32 advances to S408.

In S406, on the other hand, the CPU 32 uses the independent output profile OP3 to convert the target object data identified in S400, thereby generating CMYK image data that includes a plurality of pixels specifying a plurality of sets of coordinate values in the CMYK color space. After completing the process in S406, the CPU 32 advances to S408.

In S408 the CPU 32 determines whether all object data in the PDF file 100 has been specified in S400. Specifically, the CPU 32 advances to S410 when there are no more descriptions of object data following the target object identifier most recently identified in S400 (S408: YES). However, the CPU 32 returns to S400 when determining that there is a description of other object data (S408: NO).

Upon reaching a YES determination in S408, the CPU 32 has produced multi-value CMYK image data including a plurality of sets of CMYK image data generated from all object data. Next, in S410 the CPU 32 executes a halftone process on the multi-value CMYK image data to generate print data. After completing the process in S410, the process of FIG. 9 ends.

Effects of the Embodiment

As illustrated in the example of FIG. 8, the printer 10 classifies the plurality of input profiles IP1, etc. into groups. All of the input profiles IP1, etc. included in a single group are similar to each other. Next, the printer 10 generates the conversion table CTg1 using one of the three input profiles included in group G1 in this example and the first and second output profiles OP1 and OP2. A total of five sets of object data ("12obj", "22obj", "26obj", "30obj", and "35obj") are associated with the three input profiles in group G1. The printer 10 uses the same conversion table CTg1 to convert each of the five sets of object data into five sets of CMYK image data. Hence, the printer 10 need not use the input profile associated with each set of object data and the first and second output profiles OP1 and OP2 to convert each of the five sets of object data. Accordingly, the printer 10 more rapidly perform conversion on the five sets of object data and as a result can more quickly print the image represented by the PDF file 100.

Further, the printer 10 uses the plurality of distances between the plurality of sets of Lab coordinate values in the target profile data PD1 acquired from the input profile IP1 and the plurality of sets of Lab coordinate values in the target profile data PD2 acquired from the input profile IP2 (S200-S220 of FIG. 6) to determine whether the target profile data PD1 is similar to the target profile data PD2 (S130 of FIG. 4). Thus, the printer 10 executes actual conversions using each of the input profiles IP1 and IP2 and uses each distance between two sets of Lab coordinate values obtained through these conversions to determine appropriately whether the target profile data PD1 is similar to the target profile data PD2, i.e., whether the input profile IP1 is similar to the input profile IP2. As a result, the printer 10 can suitably identify groups of similar input profiles.

Further, the printer 10 selects the predominant input profile from the input profiles in the target group (S320 of FIG. 7). That is, the printer 10 selects the input profile that will have a relatively large effect on the image represented by the converted print data. Next, the printer 10 uses the selected input profile to generate a conversion table (S330). Therefore, the printer 10 can convert a relatively large amount of object data using the input profile associated with this object data. Accordingly, the printer 10 can produce converted image data representing an image whose colors do not differ greatly from the colors in the image represented by the PDF file 100.

Correspondences

The printer 10, network interface 16, and printing engine 18 are examples of the "image processing apparatus," the "communication interface," and the "output section," respectively. The RGB color space dependent on characteristics of the device generating the PDF file 100, the Lab color space, and the CMYK color space are examples of the "specific color space," the "first color space," and the "second color space." Further, the RGB color space representing the standard color space to which the printer converts data from the Lab color space is an example of the "third color space." In FIG. 8, the three input profiles identified by the three profile IDs "11obj", "21obj", and "25obj" included in group G1 are an example of the "j number of input-side profiles." The input profile identified by "25obj" and the conversion table CTg1 are examples of the "at least one input-side profile" and the "conversion table," respectively. The five sets of object data identified by the five data IDs "12obj", "22obj", "26obj", "30obj", and "35obj" included in group G1 are an example of the "k number of sets of object data." The input profile IP1, RGB coordinate values, and Lab coordinate values in FIG. 5 are examples of the "first input-side profile," the "prescribed coordinate value," and the "first coordinate value," respectively. The input profile IP2 and the Lab coordinate values in the target profile data PD2 in FIG. 6 are examples of the "second input-side profile" and the "second coordinate value," respectively. The first output profile OP1 and the second output profile OP2 are examples of the "first output-side profile" and the "second output-side profile," respectively.

Second Embodiment

In the second embodiment, the prescribed criterion employed in S320 of FIG. 7 differs from that used in the first embodiment. That is, the prescribed criterion for selecting an input profile in the second embodiment is to select the profile associated with object data representing the largest object. In the following description, input profile "number+obj" and object data "number+obj" will be used as the notation for the respective input profile and object data identified by the identifier "number+obj".

Further, object "number+obj" will be used as the notation for the object represented by the object data "number+obj".

The following explanation assumes that the process table PT is configured as shown in FIG. 10. When group G1 is set as the target group, in S320 of FIG. 7 the CPU 32 identifies the size of each of the objects "12obj" and "22obj" included in group G1 (see FIG. 10). As shown in FIG. 1, the size of each object is entered as the description for object identifier "99obj" in the PDF file 100. The CPU 32 identifies the size of each object by referencing the entry for "99obj". In the example of FIG. 10, the size of object "12obj" is greater than the size of object "22obj". Accordingly, the CPU 32 selects the input profile "11obj" by selecting the profile ID "11obj" associated with the data ID "12obj" in the process table PT. In this case, the CPU 32 uses the input profile "11obj" to generate the conversion table CTg1 in S330 of FIG. 7. As described above, the size of the object denotes the height and width of the object. The CPU 32 may give priority to the height when determining relations in size concerning objects in the target group in S320. That is, when one object has a height larger than that of another object, the CPU 32 may determine the one object is larger than the another object. When the one object has the height equal to that of the another object, the CPU 32 may determine whether the one object has a width larger than that of the another object. In this case, when the one object has the width larger than that of the another object the one object, the CPU 32 may determine that the one object is larger than the another object. However, the CPU 32 may give priority to the width of the object in a variation.

When group G2 is set as the target group, in S320 of FIG. 7 the CPU 32 identifies the size of each of the objects "42obj", "43obje", and "46obj" included in group G2 (see FIG. 10). In this example, a plurality of objects "42obj" and "43obj" is associated with the single profile ID "41obj". Here, the CPU 32 calculates the total size of objects "42obj" and "43obj". In the example shown in FIG. 10, the total size of these objects is smaller than the size of object "46obj". Accordingly, the CPU 32 selects the input profile "45obj" by selecting the profile ID "45obj" associated with the data ID "46obj" in the process table PT. In this example, the CPU 32 uses the input profile "45obj" to generate the conversion table CTg2 in S330 of FIG. 7. In the second embodiment, the CPU 32 compares a total size of all the objects (sum of sizes of objects) associated to one profile data in the target group with a total size of all the objects associated to another profile data in the target group when determining a relation in size concerning objects in the target group in S320.

In the second embodiment, the printer 10 can select an input profile that will have a relatively large impact on the image represented by the converted print data and can generate a conversion table using the selected input profile. Accordingly, the printer 10 can produce converted image data representing an image whose colors do not differ greatly from the colors in the image represented by the PDF file 100.

Third Embodiment

In the third embodiment, the nonvolatile area 34*a* also stores rank information RI (see FIG. 1) indicating the order of priority for each type of object data. Objects in an image represented by converted print data that are most noticeable to the user are given a higher priority. Specifically, the highest priority ranking is given to object data representing image objects, the second highest priority ranking is given to object data representing objects specifying tile patterns, and the lowest priority ranking is given to object data representing text objects. In a variation of this embodiment, the rank information RI may specify an order different from the order described above (for example, the order (1) image objects, (2) text objects, and (3) pattern objects) and may include additional priority rankings for other object types.

In the third embodiment, the prescribed criterion applied in S320 of FIG. 7 differs from that in the previous embodiments. That is, the prescribed criterion for selecting an input profile in the third embodiment is to select the profile associated with object data having the highest priority ranking according to the rank information RI.

The following explanation assumes that the process table PT is configured as shown in FIG. 10. When group G1 is set as the target group, in S320 of FIG. 7 the CPU 32 identifies the type of each of the objects "12obj" and "22obj" included in group G1 (see FIG. 10). As shown in FIG. 1, the descriptions "subtype/image" and "subtype/text" are entered for the object identifiers "12obj" and "22obj", respectively, in the PDF file 100. Thus, the CPU 32 identifies image objects and text objects as the types of the object data "12obj" and "22obj", respectively. Next, the CPU 32 references the rank information RI to find the rankings of the object data "12obj" and "22obj" and identifies the object data "12obj" representing an image object as the type of object data having the highest priority ranking. The CPU 32 selects the input profile "11obj" by selecting the profile ID "11obj" associated with the data ID "12obj" in the process table PT. In this case, the CPU 32 uses the input profile "11obj" in S330 of FIG. 7 to generate the conversion table CTg1.

Further, a plurality of sets of object data "42obj" and "43obj" is associated with the single profile ID "41obj" in the example of group G2. When these sets of object data "42obj" and "43obj" are of different types, the CPU 32 treats the set of object data having the type with the highest ranking as being the object data associated with the profile ID "41obj" and selects an input profile in the same way described with group G1.

In the third embodiment, the printer 10 selects the input profile associated with object data that is most noticeable to the user. The configuration according to the third embodiment can suppress the user's impression that colors of an image based on converted image data is different from the colors in the image represented by the PDF file 100.

Fourth Embodiment

In the fourth embodiment, the prescribed criterion applied in S320 of FIG. 7 differs from that described in the above embodiments. That is, the prescribed criterion for selecting the input profile in the fourth embodiment is to select the profile associated with object data representing the object having the largest flesh-colored region.

The following explanation assumes that the process table PT is configured as shown in FIG. 10. When group G1 is set as the target group, in S320 of FIG. 7 the CPU 32 identifies a size of fresh-colored region of each of the objects "12obj" and "22obj" included in group G1 (see FIG. 10). Specifically, first, the CPU 32 acquires RGB image data in the form of bitmap data representing the objects "12obj" and "22obj". If object "12obj" is an image object, for example, the object data OD1 is the RGB image data itself. In this case, the CPU 32 acquires RGB image data representing the object "12obj" by acquiring the object data OD1 from the PDF file 100. Further, if the object "22obj" is a text object, for example, the object data OD2 includes commands for describing text. In this case, the CPU 32 executes the commands to generate RGB image data representing the object "22obj". Next, the CPU 32 identifies the number of pixels constituting the RGB image data that specify a flesh color and neighboring colors of the flesh color within a predetermined color range (hereinafter called the "number of flesh-colored pixels") for each set of RGB image data acquired above. In the example of FIG. 10, the number of flesh-colored pixels in the object "12obj" is greater than the number of flesh-colored pixels in the object "22obj". Accordingly, the CPU 32 selects the input profile "11obj" by selecting the profile ID "11obj" associated with the data profile "12obj" in the process table PT. In this case, the CPU 32 uses the input profile "11obj" in S330 of FIG. 7 to generate the conversion table CTg1.

When a plurality of objects "42obj" and "43obj" is associated with a single profile ID "41obj", as in group G2, the CPU 32 compares the total number of flesh-colored pixels in the plurality of objects "42obj" and "43obj" to the number of flesh-colored pixels in the object "46obj" and selects the input profile in the same manner described for group G1. In the fourth embodiment, the CPU 32 compares a total number of flesh-colored pixels in all the objects associated to one profile data in the target group with a total number of flesh-colored pixels in all the objects associated to another profile data in the target group when selecting an input profile.

Generally, the user more readily perceives differences between colors in the input image and colors in the output image when the flesh colors in the input image differ from those in the output image. In view of this phenomenon, the printer 10 according to the fourth embodiment selects an input profile on the basis of the size of the flesh-colored region. Accordingly, the printer 10 can produce converted image data representing an image whose flesh colors do not differ greatly from the flesh colors in the image represented by the PDF file 100. The configuration according to the fourth embodiment can suppress the user's impression that flesh colors of an image based on converted image data is different from the flesh colors in the image represented by the PDF file 100.

While the disclosure has been described in detail with reference to the above embodiments, it would be apparent to those skilled in the art that various changes and modifications may be made thereto.

Variation 1

In the embodiments described above, the CPU 32 acquires the PDF file 100 from the terminal apparatus 50 via the network interface 16. As an alternative, the CPU 32 may acquire the PDF file 100 from a memory device through a memory interface in which the memory device is detachably mounted, for example. Further, if a personal computer is used in place of the printer 10 as an example of the image processing apparatus, the CPU of the personal computer may acquire the PDF file 100 by reading the PDF file 100 from a memory in the personal computer.

Variation 2

The following are some possible variations of S320 in FIG. 7. (1) The CPU 32 may select a single input profile by selecting the profile ID that was first recorded in the process table PT from among the profile IDs in the target group. (2) Alternatively, the CPU 32 may generate a single input profile having all conversion characteristics of the plurality of input profiles identified by the plurality of profile IDs in the target group. Specifically, the CPU 32 uses each of the plurality of input profiles to calculate one set of Lab coordinate values from one predetermined set of RGB coordinate values. Next, the CPU 32 associates this set of RGB coordinate values with the median of the plurality of sets of Lab coordinate values acquired using the plurality of input profiles. The CPU 32 executes the same process on each of the other predetermined sets of RGB coordinate values to generate the single input profile. In general, the CPU 32 may generate a conversion table using just one of the j number of input-side color conversion profiles, as in the embodiments described above, or may generate the conversion table using some of the j number of input-side color conversion profiles.

Variation 3

Figure 3:
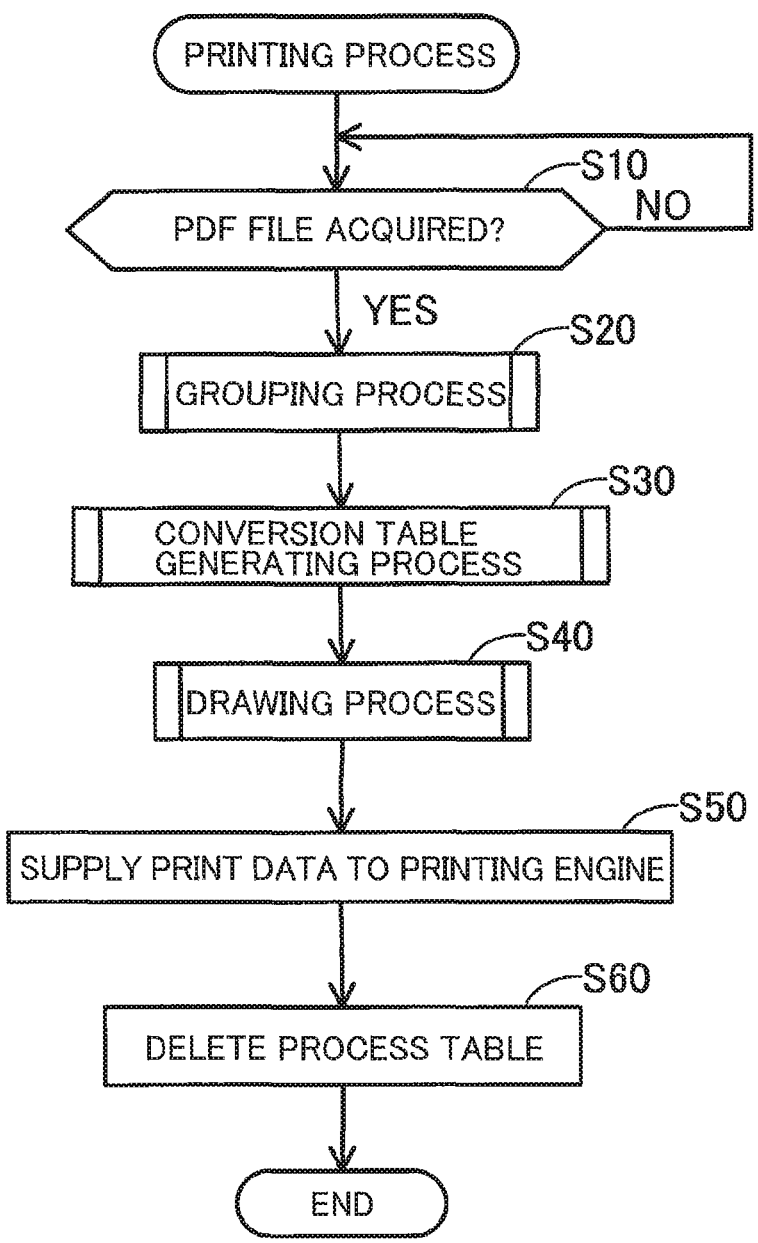
FIG. 3 is a flowchart illustrating a printing process according to the first embodiment.

In S320 of FIG. 3, the CPU 32 may specify just a single group. For example, the CPU 32 performs conversion on each set of object data included in the group that was first recorded in the process table PT (group G1 in the example of FIG. 8) using the same conversion table (conversion table CTg1 in the example of FIG. 8). For each of the other sets of object data, the CPU 32 generates a conversion table using the input-side profile associated with the object data and the first and second output profiles OP1 and OP2. Next, the CPU 32 may perform conversion on each of the other sets of object data using the individual conversion table obtained from the input profile associated with the object data and the first and second output profiles OP1 and OP2. Generally speaking, the image processing apparatus of the disclosure may convert k number of sets of object data using a single conversion table and may (1) form groups with the remaining (K-k) number of sets of object data, as in the embodiments described above, (2) convert the remaining (K-k) number of sets of object data using conversion tables obtained from the input-side profile and at least one of output-side profiles, (3) convert the remaining (K-k) number of sets of object data using a default conversion table, or (4) convert the remaining (K-k) number of sets of object data sequentially using the input-side profile and output-side profiles rather than a conversion table.

Variation 4

Rather than calculating the similarity index value IV in S210 and S220 of FIG. 6 by subtracting the arithmetic average $D_{ave}$ for the M number of distances from a prescribed value (128 in the embodiment), the CPU 32 may use the arithmetic average $D_{ave}$ itself as the similarity index or may use the sum of the M distances as the similarity index. In these cases, a larger similarity index value denotes a lower degree of similarity. Therefore, when the CPU 32 determines in S130 of FIG. 4 that the smallest similarity index value among the index values for all the respective sets of standard profile data in the target group is less than or equal to the threshold value, the CPU 32 determines that the target profile data is similar to the standard profile data corresponding to the smallest similarity index value (S130: YES).

Variation 5

Rather than using the M number of sets of RGB coordinate values P1-PM in S102 of FIG. 4, the CPU 32 may use a single set of RGB coordinate values to generate the target profile data. In this case, the CPU 32 calculates only a single distance in S200 of FIG. 6 and skips steps S210 and S220. When the CPU 32 determines in S130 of FIG. 4 that the smallest distance among distances (i.e., each similarity index value) calculated from respective sets of standard profile data is less than or equal to the threshold value, the CPU 32 determines that the target profile data is similar to the standard profile data corresponding to the smallest distance (S130: YES).

Variation 6

In S122 of FIG. 4, the CPU 32 may determine whether the similarity index value is greater than the threshold value each time a similarity index value is calculated. When determining that the similarity index value is greater than the threshold value, the CPU 32 may advance to S160 without calculating the similarity index values for other sets of standard profile data. When determining that the similarity index value is less than or equal to the threshold, the CPU 32 may calculate similarity index values for the other sets of standard profile data.

Variation 7

Rather than using the M number of sets of RGB coordinate values P1-PM in S102 of FIG. 4, the CPU 32 may perform reverse conversion on M sets of predetermined Lab coordinate values using the target input profile to generate M number of sets of RGB coordinate values. Further, the target profile data may include M number of sets of coordinate value data correlating the M number of sets of generated RGB coordinate values with the M number of sets of predetermined Lab coordinate values. In this case, in S200 of FIG. 6 the CPU 32 may calculate M number of distances between the M number of sets of generated RGB coordinate values in the target profile data PD1 and the M number of sets of generated RGB coordinate values in the target profile data PD2. In this variation, the set of Lab coordinate values, the set of generated RGB coordinate values in the target profile data PD1, and the set of generated RGB coordinate values in the target profile data PD2 are examples of the "prescribed coordinate value," "first coordinate value," and "second coordinate value," respectively.

Variation 8

The method of determining similarity among input profiles is not limited to the method in the embodiments described above. For example, the CPU 32 may determine that two input profiles are similar when the same attribute information (profile name or the like, for example) is associated with the two input profiles. This type of method is another example of "identifying j number of input-side profiles from among the J number of input-side profiles."

Variation 9

In S310 and S330 of FIG. 7, the CPU 32 may use just the input profile and the first output profile OP1 to generate the conversion table, without using the second output profile OP2. In this case, the conversion table includes data for converting sets of coordinate values in the RGB color space dependent on characteristics of the device that generated the PDF file 100 to sets of coordinate values in the RGB color space serving as the standard color space. Next, in S404 of FIG. 9 the CPU 32 performs color conversion on the object data using the conversion table to generate RGB image data and performs color conversion on the RGB image data using the second output profile OP2 to generate CMYK image data. In this variation, the standard color space (RGB color space) is an example of the "second color space." Further, only the first output profile OP1 is an example of the "output-side color conversion profile."

Variation 10

The memory 34 may store a single output profile having both of conversion characteristics of the first output profile OP1 and conversion characteristics of the second output profile OP2, rather than storing the first and second output profiles OP1 and OP2 themselves. This single output profile includes data for converting sets of coordinate values in the Lab color space to sets of coordinate values in the CMYK color space. In this case, in S310 and S330 of FIG. 7 the CPU 32 generates a conversion table using the input profile and the single output profile. In this variation, the single output profile is an example of the "output-side color conversion profile."

Variation 11

After generating RGB image data including a plurality of pixels specifying a plurality of sets of coordinate values in the RGB color space (standard color space), the CPU 32 may supply the RGB image data to the display 14 and direct the display 14 to display an image represented by the RGB image data. In this variation, the display 14 is an example of the "output section." Further, the RGB color space (standard color space) is an example of the "second color space."

Variation 12

While the CPU 32 uses the sizes of flesh-colored regions in the fourth embodiment described above, the CPU 32 may instead use the sizes of regions of another color, such as red regions or blue regions. In this variation, the other color and the colors neighboring the other color are an example of the "colors in the predetermined color range."

Variation 13

The CPU 32 may execute the same processes described in the embodiments when acquiring files of another format (the JPEG format, for example) rather than PDF files. In other words, the "target file" may be a file of any format, provided that the format correlates an input profile with object data.

Variation 14

The image processing apparatus in the disclosure need not be the printer 10, but may be another device, such as a personal computer, a server, or a portable terminal. For example, a personal computer may generate print data by executing the same processes described in the embodiments and may transmit the print data to the printer. In this case, the printer is an example of the "output section."

Variation 15

External memory configured separately from the printer 10 (USB memory, a server, a personal computer, or the like) may be used to store the output profiles OP1-OP3, the rank information RI, and the process table PT, and the CPU 32 may execute the process in FIG. 3 using this external memory. In this case, the external memory is an example of the "memory". Further, the CPU 32 need not execute all processes described in the embodiments. Other devices may execute some or all of these processes. For example, after executing S10 of FIG. 3, the CPU 32 may transmit the PDF file 100 to at least one server. In this case, a first server executes the processes in S20-S40 of FIG. 3 and transmits the resulting print data to the printer 10. Next, the CPU 32 executes step S50. In this variation, the printer 10 and the first server together are an example of the image processing apparatus. As a separate variation, the first server described above may execute step S20, a second server configured separately from the first server may execute step S30, and a third server configured separately from the first and second servers may execute step S40. In this variation, the printer 10 and the first through third servers combined are an example of the image processing apparatus.

Variation 16

In the embodiments described above, the CPU 32 executes processes based on the programs 36 to implement the various processes in FIGS. 2 through 10. Alternatively, at least one of the various processes in FIGS. 2 through 10 may be implemented in logic circuits or other hardware.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. An image processing apparatus comprising:
 a processor; and
 a memory storing computer-readable instructions therein, the computer-readable instructions, when executed by the processor, causing the image-processing apparatus to perform:
 acquiring a target file having K number of sets of object data and J number of input-side profiles where K is an integer larger than or equal to two and J is an integer larger than or equal to two, each of the K number of sets of object data defining color by a coordinate value in a specific color space, each of the K number of sets of object data being correlated to one of the J number of input-side profiles, each of the J number of input-side profiles including data for converting a coordinate value in the specific color space to a coordinate value in a first color space;
 specifying j number of input-side profiles from among the J number of input-side profiles where j is an integer larger than or equal to two and smaller than or equal to J;
 generating a conversion table by using at least one of the j number of input-side profiles and an output-side profile after the j number of input-side profiles are specified, the output-side profile including data for converting a coordinate value in the first color space to a coordinate value in the second color space, the conversion table including data for converting a coordinate value in the specific color space to a coordinate value in the second color space without generating a coordinate value in the first color space;
 generating k number of sets of partial image data by converting respectively k number of sets of object data using the conversion table where k is an integer larger than or equal to two and smaller than or equal to K, each of the k number of sets of object data among the K number of sets of object data being correlated to one of the j number of input-side profiles, each of the k number of sets of partial image data having a plurality of pixel values respectively representing a plurality of coordinate values in the second color space; and
 outputting an image represented by the target file using the k number of sets of partial image data.

2. The image processing apparatus according to claim 1, wherein the generating a conversion table includes selecting an input-side profile to which maximum number of sets of object data is correlated among the j number of input-side profiles,
 wherein the conversion table is generated using the selected input-side profile and the output-side profile.

3. The image processing apparatus according to claim 1, wherein the generating a conversion table includes:
 specifying a set of object data representing an object having a maximum size in the image among k number of objects represented by the k number of sets of object file correlated to the j number of input-side profiles; and
 selecting an input-side profile correlated to the specified set of object data among the j number of input-side profiles,
 wherein the conversion table is generated using the selected input-side profile and the output-side profile.

4. The image processing apparatus according to claim 1, wherein the memory is configured to store priority ranking data indicating a priority ranking awarded each type of the sets of object data,
 wherein the generating a conversion table includes:
 specifying a set of object data belonging to a type having a highest priority ranking from among the k number of sets of object data correlated to the j number of input-side profiles according to the priority ranking; and
 selecting an input-side profile correlated to the specified set of object data among the j number of profiles,
 wherein the conversion table is generated using the selected input-side profile and the output-side profile.

5. The image processing apparatus according to claim 1, wherein the generating a conversion table includes:
 specifying a set of object data having a largest region of colors within a prescribed color range among the k number of sets of object data correlated to the j number of input-side profiles; and
 selecting an input-side profile correlated to the specified set of object data among the j number of profiles,
 wherein the conversion table is generated using the selected input-side profile.

6. The image processing apparatus according to claim 1, wherein the J number of input-side profiles includes a first input-side profile and a second input-side profile,
 wherein the specifying includes:
 converting a predetermined coordinate value in one of the specific color space and the first color space to a first coordinate value in a remaining one of the specific color space and the first color space by using the first input-side profile;
 converting the predetermined coordinate value to a second coordinate value in the remaining one of the specific color space and the first color space by using the second input-side profile;
 determining whether the first input-side profile is similar to the second input-side profile by comparing an index value with a predetermined threshold value, the index value being obtained by a distance between the first coordinate value and the second coordinate value and indicating a degree of similarity between the first input-side profile and the second input-side profile; and
 specifying both the first input-side profile and the second input-side profile as one of the j number of input-side profiles when the determining determined that the first input-side profile is similar to the second input-side profile.

7. The image processing apparatus according to claim 1, wherein the output-side profile includes a first output-side profile and a second output-side profile,
 wherein the first output-side profile includes data for converting a first coordinate value in the first color space to a second coordinate value in a third color space,
 wherein the second output-side profile includes data for converting the second coordinate value to a third coordinate value in the second color space.

8. A non-transitory computer readable storage medium storing a set of program instructions thereon that, when executed by a computer, cause the computer to perform operations comprising:

acquiring a target file having K number of sets of object data and J number of input-side profiles where K is an integer larger than or equal to two and J is an integer larger than or equal to two, each of the K number of sets of object data defining color by a coordinate value in a specific color space, each of the K number of sets of object data being correlated to one of the J number of input-side profiles, each of the J number of input-side profiles including data for converting a coordinate value in the specific color space to a coordinate value in a first color space;

specifying j number of input-side profiles from among the J number of input-side profiles where j is an integer larger than or equal to two and smaller than or equal to J;

generating a conversion table by using at least one of the j number of input-side profiles and an output-side profile after the j number of input-side profiles are specified, the output-side profile including data for converting a coordinate value in the first color space to a coordinate value in the second color space, the conversion table including data for converting a coordinate value in the specific color space to a coordinate value in the second color space without generating a coordinate value in the first color space;

generating k number of sets of partial image data by converting respectively k number of sets of object data using the conversion table where k is an integer larger than or equal to two and smaller than or equal to K, each of the k number of sets of object data among the K number of sets of object data being correlated to one of the j number of input-side profiles, each of the k number of sets of partial image data having a plurality of pixel values respectively representing a plurality of coordinate values in the second color space; and outputting an image represented by the target file using the k number of sets of partial image data.

9. The non-transitory computer readable storage medium according to claim 8, wherein the generating a conversion table includes selecting an input-side profile to which maximum number of sets of object data is correlated among the j number of input-side profiles, wherein the conversion table is generated using the selected input-side profile and the output-side profile.

10. The non-transitory computer readable storage medium according to claim 8, wherein the generating a conversion table includes:

specifying a set of object data representing an object having a maximum size in the image among k number of objects represented by the k number of sets of object file correlated to the j number of input-side profiles; and selecting an input-side profile correlated to the specified set of object data among the j number of input-side profiles, wherein the conversion table is generated using the selected input-side profile and the output-side profile.

11. The non-transitory computer readable storage medium according to claim 8, the non-transitory computer readable storage medium being configured to store priority ranking data indicating a priority ranking awarded each type of the sets of object data, wherein the generating a conversion table includes:

specifying a set of object data belonging to a type having a highest priority ranking from among the k number of sets of object data correlated to the j number of input-side profiles according to the priority ranking; and selecting an input-side profile correlated to the specified set of object data among the j number of profiles, wherein the conversion table is generated using the selected input-side profile and the output-side profile.

12. The non-transitory computer readable storage medium according to claim 8, wherein the generating a conversion table includes:

specifying a set of object data having a largest region of colors within a prescribed color range among the k number of sets of object data correlated to the j number of input-side profiles; and selecting an input-side profile correlated to the specified set of object data among the j number of profiles, wherein the conversion table is generated using the selected input-side profile.

13. The non-transitory computer readable storage medium according to claim 8, wherein the J number of input-side profiles includes a first input-side profile and a second input-side profile, wherein the specifying includes:

converting a predetermined coordinate value in one of the specific color space and the first color space to a first coordinate value in a remaining one of the specific color space and the first color space by using the first input-side profile;

converting the predetermined coordinate value to a second coordinate value in the remaining one of the specific color space and the first color space by using the second input-side profile;

determining whether the first input-side profile is similar to the second input-side profile by comparing an index value with a predetermined threshold value, the index value being obtained by a distance between the first coordinate value and the second coordinate value and indicating a degree of similarity between the first input-side profile and the second input-side profile; and specifying both the first input-side profile and the second input-side profile as one of the j number of input-side profiles when the determining determined that the first input-side profile is similar to the second input-side profile.

14. The non-transitory computer readable storage medium according to claim 8, wherein the output-side profile includes a first output-side profile and a second output-side profile, wherein the first output-side profile includes data for converting a first coordinate value in the first color space to a second coordinate value in a third color space, wherein the second output-side profile includes data for converting the second coordinate value to a third coordinate value in the second color space.

* * * * *